April 21, 1942.   M. A. MULLER   2,280,659
ANTIFRICTION BEARING
Filed July 24, 1939
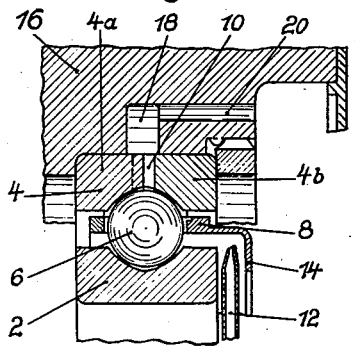
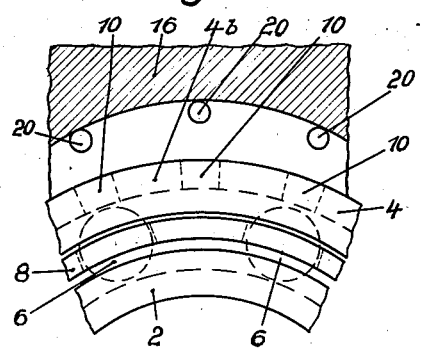
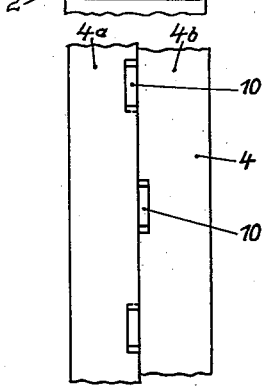
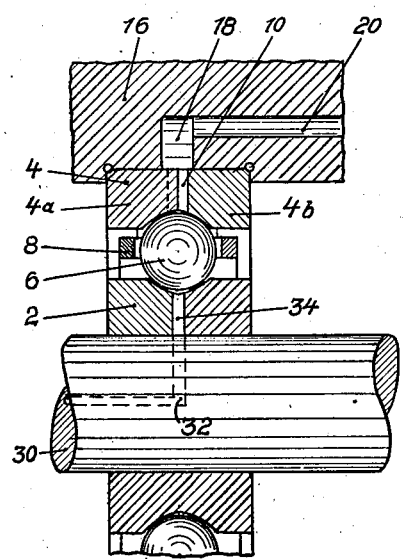
Inventor:
Max Adolf Muller,
Bailey & Pearson
Attorneys Patented Apr. 21, 1942

2,280,659

UNITED STATES PATENT OFFICE 2,280,659

ANTIFRICTION BEARING

Max Adolf Muller, Biederitz, Germany, assignor to Junkers Flugzeug-und-Motorenwerke Aktiengesellschaft, a corporation of Germany Application July 24, 1939, Serial No. 286,246
In Germany July 30, 1938

5 Claims. (Cl. 308—187)

This invention is directed to the construction of anti-friction bearings, with particular reference to the lubrication thereof.

In the reduction of friction in high speed journals, both ball and roller bearings have been used with a great deal of success. Ball bearings which make a four point contact with the raceways are particularly successful. However the cooling and lubrication of these bearings is not all that could be desired as centrifugal force causes the pressure of the oil in the outer race to become so great as to make the oil break down and foam, with a resultant loss of lubrication and an increase in the heating of the bearing. The centrifugal force throws the oil with such great pressure against the outer race that in known constructions it is substantially impossible to circulate the oil through the bearing without loss of lubrication. Prior art attempts to obtain a flow of oil through the bearing by spraying or pressure feeding have not been successful in eliminating this difficulty.

It is an object of this invention to construct an anti-friction bearing so that lubricating oil can circulate freely therethrough.

Another object of the invention is to provide an improved method of feeding oil to an antifriction bearing.

Another object of the invention is to construct a bearing so that oil under pressure created by centrifugal force is not trapped and disintegrated within the bearing.

Another object of the invention is to construct novel raceways for anti-friction bearings so that oil under pressure developed by centrifugal force can escape from the bearing whereby the oil and the bearing are both kept cool and in good condition.

Generally these objects of the invention are accomplished by forming relatively closely spaced radially extending openings around the entire periphery of the outer circular raceway of the bearing. These openings communicate between the inner surface of the raceway and a collecting channel formed in the mounting for the bearing, so that oil forced by centrifugal pressure against the inner surface of the outer raceway passes through the openings into the channel, from whence it is removed to a reservoir for recirculation. This construction is particularly suitable for four point contact ball bearings, and for double row roller bearings, as the openings can be made in between the points of contact of the balls or rollers and the races.

Oil can be fed to the bearing through a nozzle extending transversely of the bearing, or can be fed, according to an improved method, through openings extending radially through the inner race.

The means by which the objects of the invention are obtained are more fully described in the following description taken in connection with the drawing, in which:

Fig. 1 is a cross-sectional view of a four point contact ball bearing having raceways constructed according to this invention;

Fig. 1a is a view similar to Fig. 1 but showing a modified arrangement of the oil injection nozzle;

Fig. 2 is a side view of Fig. 1;

Fig. 3 is a top plan view of the outer race shown in Figs. 1 and 2;

Fig. 4 is a cross-sectional view of the invention applied to a double row roller bearing; and Fig. 5 is a cross-sectional view similar to Fig. 1 and showing in addition means for circulating oil through the inner race to the outer race.

Similar reference characters refer to similar parts in the various figures of the drawing.

In Figs. 1, 2, and 3 the bearing is composed of an inner circular race 2, an outer circular race 4, between which rotate balls 6 held in place by a cage 8. Outer race 4 is composed of two similar annular members 4a and 4b, each of which forms a half of the outer race and has one side thereof radially grooved at 10. The assembled members are disposed so that the grooves in one half are alternately positioned with respect to the grooves in the other half, and thus form a plurality of relatively closely spaced radially extending openings through the outer race around the entire circumference thereof. The described construction is preferred because of the ease in forming the two halves and the milling of the grooves. If it is desired to construct the outer race as a single ring, radially extending borings therethrough will serve the same purpose as grooves 10.

The inner bearing surfaces of races 2 and 4 are given curvatures greater than those of balls 6 so that balls 6 contact the races at four points, two of which lie on opposite sides of grooves 10. Oil is supplied to the bearing through nozzle 12, the outlet end of which lies inwardly of flange 14 which projects from cage 8, and which directs the oil against balls 6 and between balls 6 and inner race 2. Instead of employing an oil directing flange 14, the nozzle itself can be directed transversely of the bearing as shown by the nozzle 12a in Fig. 1a.

Under centrifugal force, oil flows from race 2 to outer race 4. In prior known constructions no adequate means was provided for removing the oil which collected between balls 6 and outer race 4. Especially in high speed journals the centrifugal force is large enough to create great oil pressure at the outer race, and this pressure in connection with the heat developed within the bearing, causes the oil to foam, with a resultant loss of lubrication. Moreover the pressures developed can become greater than the pressure of fresh oil supplied to the bearing, so that no flow of oil in the bearing, which would relieve this critical condition, was possible. At best, only an insufficient supply of cool and fresh oil could be obtained.

By the structure of this invention a space exists between ball 6 and race 4, the space extending the distance between the points of contact of ball 6 with race 4. Oil collects in this space and under the pressure given thereto by centrifugal force is driven through grooves 10.

Mounting 16 for race 4 has an annular channel 18 formed therein, which channel communicates with grooves 10. Oil received in channel 18 is removed from the mounting through bores 20, and conducted by any convenient means to a reservoir. Thus oil flows freely through the bearing without heating, foaming, or otherwise having its lubricating qualities impaired.

The invention is not restricted to ball bearings, but may be advantageously used with other types of bearings as with the double row roller bearing shown in Fig. 4. Here two roller bearings 22 and 24 are supported between inner race 26 and outer race 28. The outer race has grooves or bores 10 extending outwardly from the inner surface of the race to remove oil collecting against its inner surface under the action of centrifugal force.

The invention has another important advantage in that the inner race can be provided with passages for the purpose of feeding oil to the bearing, and thereby eliminating the weight or bulk of the nozzle 12 of Fig. 1, with its attendant fittings. In Fig. 5 such a construction is shown. Shaft 30 is bored at 32 to form a conduit for supplying oil to the bearing. Inner race 2 is grooved or bored to form one, or a plurality of radially extending conduits 34 which provide communication between bore 32 and balls 6. The outer race 4, and the remainder of the bearing is similar to that illustrated in Fig. 1. In Fig. 5 a stream of lubricating oil flows continuously from bore 34 outwardly of the channel through grooves 10, and all parts of the bearing are adequately lubricated.

The objects of the invention have therefore been obtained by means of a relatively simple construction. Oil is no longer retained in the space between the balls or rollers and the inner surface of the outer race, and fresh oil is continuously circulated to all parts of the bearing. By reason of the reduction in oil pressure and the cooling of the bearing by continuously feeding fresh oil, higher rotational speeds are obtained than is possible with previously known bearings. In addition the feeding of oil to the bearing through bores in the inner race constitutes a reduction in bulk and weight over bearings employing auxiliary oil injection devices.

Having disclosed the means by which the objects of the invention are obtained, I claim:

1. A high speed anti-friction roller bearing comprising an inner race, an outer race having a grooved trackway therein, balls between the inner and outer races with each ball making a two point contact with the walls of said trackway, and a plurality of oil discharge outlets extending through said outer race from points between the two point ball contacts in said trackway, said outlets being sufficiently close to each other around said outer race to pass oil outwardly of said bearing before the oil breaks down and foams while the bearing operates at high speeds.

2. A high speed four point contact roller bearing comprising an inner race, an outer race, and balls between the inner and outer races; each of said races having a surface shaped to make a two point contact trackway for the balls, said outer race, at least, having its surface intermediate the points of contact with said balls spaced from said balls to form an oil collecting groove, and a plurality of bores extending through said outer race from said groove and being sufficiently close to each other around said outer race to pass oil outwardly of said bearing before the oil can break down and foam while the bearing operates at high speeds.

3. A high speed bearing as in claim 2 further comprising means for introducing oil into said bearing adjacent said inner race.

4. A high speed bearing as in claim 2 further comprising a surface upon said inner race shaped to provide an oil distributing groove between the points of contact of said balls with said inner race surface, and means for introducing oil into said distributing groove.

5. A high speed bearing as in claim 2 further comprising a surface upon said inner race shaped to provide an oil distributing groove between the points of contact of said balls with said inner race surface, a plurality of bores extending through said inner race from said distributing groove and being spaced about the entire circumference of said inner race, and means for introducing oil into said inner race bores.

MAX ADOLF MULLER.